US012578506B2

(12) United States Patent
Boyd et al.

(10) Patent No.: US 12,578,506 B2
(45) Date of Patent: Mar. 17, 2026

(54) OPTICAL FILM FOR THE REDUCTION OF OPTICAL ARTIFACTS

(71) Applicant: 3M INNOVATIVE PROPERTIES COMPANY, St. Paul, MN (US)

(72) Inventors: Gary T. Boyd, Woodbury, MN (US); David A. Rosen, North Saint Paul, MN (US); Tao Liu, Woodbury, MN (US); Matthew M. Philippi, St. Paul, MN (US); Brett J. Sitter, Marine on St Croix, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 528 days.

(21) Appl. No.: 18/138,891

(22) Filed: Apr. 25, 2023

(65) Prior Publication Data

US 2023/0350101 A1 Nov. 2, 2023

Related U.S. Application Data

(60) Provisional application No. 63/336,345, filed on Apr. 29, 2022.

(51) Int. Cl.
 *G02B 1/11* (2015.01)
 *G02B 27/00* (2006.01)
(52) U.S. Cl.
 CPC ............ *G02B 1/11* (2013.01); *G02B 27/0018* (2013.01)

(58) Field of Classification Search
 CPC ................. G02B 1/11; G02B 27/0018; G02B 2005/1804; G02B 5/1861; G02B 5/1866
 See application file for complete search history.

(56) References Cited

U.S. PATENT DOCUMENTS

| | | | |
|---|---|---|---|
| 9,454,031 B2 | 9/2016 | Gollier | |
| 2017/0115498 A1* | 4/2017 | Sitter | G02B 5/0242 |
| 2017/0131559 A1* | 5/2017 | Sitter | G02B 27/4272 |
| 2018/0329207 A1* | 11/2018 | Sitter | G02B 5/0215 |
| 2019/0023947 A1* | 1/2019 | Sitter | B29D 11/00 |
| 2020/0230848 A1 | 7/2020 | Radcliffe et al. | |
| 2020/0333601 A1 | 10/2020 | Yang et al. | |

FOREIGN PATENT DOCUMENTS

WO         2019202554 A1    10/2019

* cited by examiner

*Primary Examiner* — Jia X Pan
(74) *Attorney, Agent, or Firm* — Jonathan L. Tolstedt

(57) ABSTRACT
An optical film for reducing at least one of sparkle and moire in a display system includes a structured first major surface that, in at least a first cross-section in a first plane substantially orthogonal to the optical film, has a sinusoidal shape having a variable pitch of greater than about 0.5 microns. For a substantially normally incident light and blue, green, and red wavelengths that are at least 50 nm apart from each other and are disposed within respective blue, green, and red wavelength ranges, optical transmissions of the optical film versus transmitted angle for the blue, green and red wavelengths have respective blue, green, and red transmission bands disposed at angles greater than about 1 degree and having respective blue, green, and red full width at half maxima (FWHMs), at least two of which at least partially overlap.

20 Claims, 9 Drawing Sheets

10

11'

100'

CS1 coorinate
System.

CS2 coorinate
System.

$$S(r) = S0[1 + 2g(r - \tfrac{1}{2})]$$

$$g = (Sb - Sa)/N = \Delta S$$

$$Sn = Sa + K*g, \; K = (1 \; to \; N\text{-}1)$$

OPTICAL FILM FOR THE REDUCTION OF OPTICAL ARTIFACTS

SUMMARY

In some aspects of the present description, an optical film for reducing at least one of sparkle and moire in a display system is provided, the optical film including a structured first major surface that in at least a first cross-section in a first plane substantially orthogonal to the optical film has a sinusoidal shape having a variable pitch of greater than about 0.5 microns, such that for a substantially normally incident light and blue, green, and red wavelengths that are at least 50 nm apart from each other and are disposed within respective blue, green and red wavelength ranges extending respectively from about 420 nm to about 480 nm, about 490 nm to about 560 nm, and about 590 nm to about 670 nm, optical transmissions of the optical film versus transmitted angle for the blue, green, and red wavelengths have respective blue, green, and red transmission bands disposed at angles greater than about 1 degree and having respective blue, green, and red full width at half maxima, at least two of which at least partially overlap.

In some aspects of the present description, a for reducing at least one of sparkle and moire in a display system is provided, the optical film including at least one structured major surface that, in at least a first cross-section in a first plane substantially orthogonal to the optical film, includes a repeating pattern of a same group of N first structures, such that N≥2. The N first structures are arranged in the group at a substantially random spacing S having values in a range from about 0.5 microns to about 500 microns and determined from a same predetermined function S(r), where r is a random number with a probability distribution, such that for a substantially normally incident light and blue, green, and red wavelengths that are at least 50 nm apart from each other and are disposed within respective blue, green and red wavelength ranges extending respectively from about 420 nm to about 480 nm, about 490 nm to about 560 nm, and about 590 nm to about 670 nm, optical transmissions of the optical film versus transmitted angle for the blue, green and red wavelengths include respective blue, green, and red transmission bands disposed at angles greater than about 1 degree and having respective blue, green, and red full width at half maxima (FWHMs), at least two of which at least partially overlap.

In some aspects of the present description, an optical film for reducing at least one of sparkle and moire in a display system is provided, the optical film including at least one structured major surface that, in at least a first cross-section in a first plane substantially orthogonal to the optical film, includes a repeating pattern of a same group of N first structures, such that N≥2. The N first structures are arranged in the group at spacings in a range from about 0.5 microns to about 500 microns, such that the spacing between each pair of adjacent structures in the group is K*ΔS microns, where ΔS is a constant greater than about 0.5 and K is an integer randomly chosen between 1 and N−1, with K being different for each pair of adjacent structures in the group. For a substantially normally incident light and blue, green, and red wavelengths that are at least 50 nm apart from each other and are disposed within respective blue, green, and red wavelength ranges extending respectively from about 420 nm to about 480 nm, about 490 nm to about 560 nm, and about 590 nm to about 670 nm, optical transmissions of the optical film versus transmitted angle for the blue, green and red wavelengths include respective blue, green, and red transmission bands disposed at angles greater than about 1 degree and having respective blue, green, and red full width at half maxima (FWHMs), wherein at least 20% of the green FWHM overlaps each of the blue and red FWHMs.

DETAILED DESCRIPTION

Figure 1:
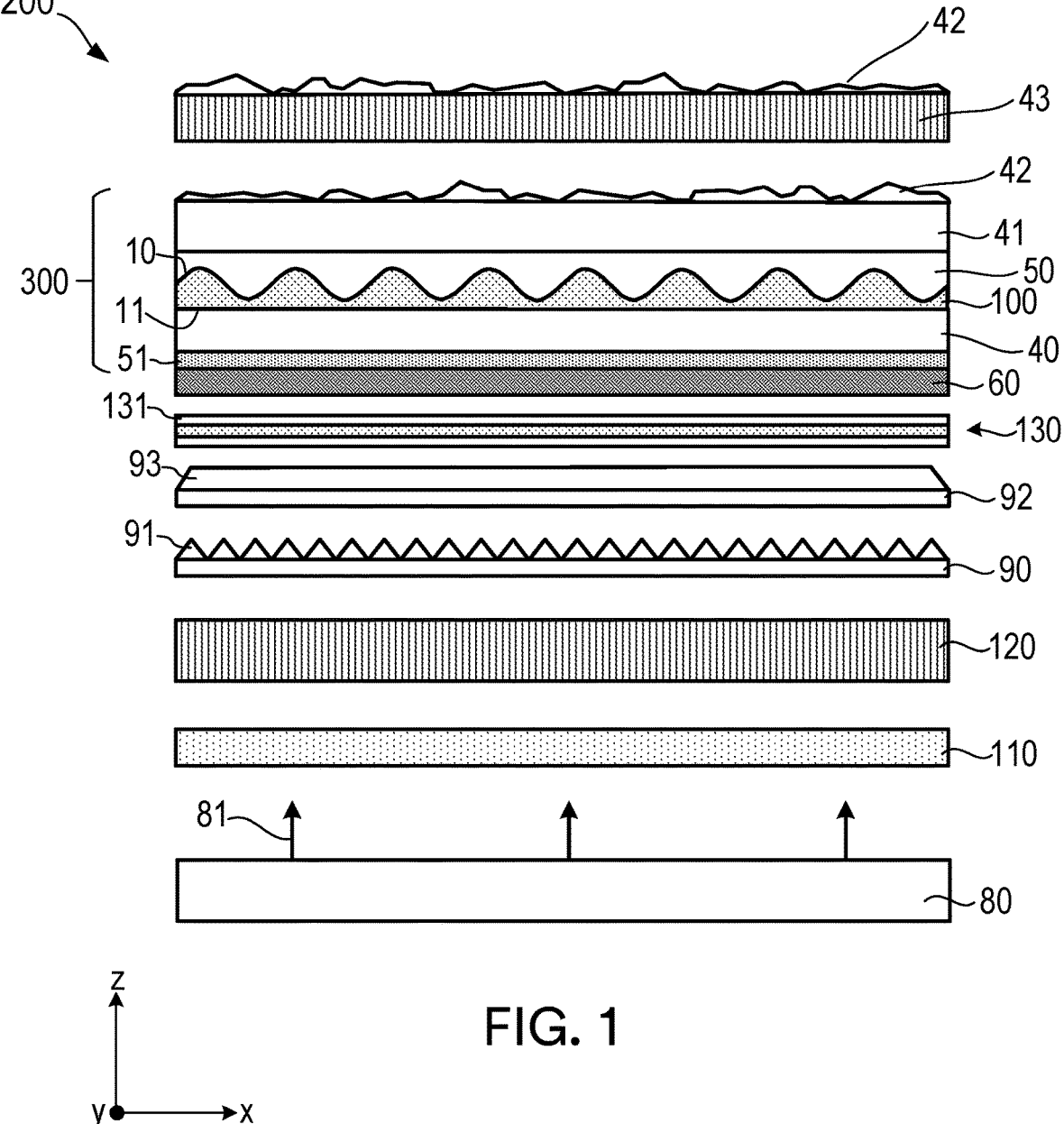
FIG. 1 is a side view of a display system including an optical film for reducing optical artifacts in a display system, in accordance with an embodiment of the present description.

In the following description, reference is made to the accompanying drawings that form a part hereof and in which various embodiments are shown by way of illustration. The drawings are not necessarily to scale. It is to be understood that other embodiments are contemplated and may be made without departing from the scope or spirit of the present description. The following detailed description, therefore, is not to be taken in a limiting sense.

As used herein, the term "display" or "display panel" may refer to any appropriate type of display, including but not limited to a liquid crystal display (LCD) or an organic light-emitting diode (OLED) display. Digital displays including LCD and OLED displays generally use an array of regularly spaced pixels and sub-pixels to form an image. These displays are typically protected by a cover glass or plastic sheet that is coupled to the display (e.g., by an optically transparent material such as an optically clear adhesive) to help reduce stray reflections that would result from air interfaces. A touch panel layer may also be included between the cover glass and the display. In some embodiments, the front surface of the cover glass may be smooth, characterized by a high gloss level. These high-gloss surfaces tend to specularly reflect light which may result in an objectionable glare. Alternatively, the cover glass front surface may be made to be somewhat diffuse to provide an anti-glare function, which is characterized by a lower gloss level. However, the combination of an anti-glare surface and a digital display may lead to an optical artifact known as sparkle (or, alternately, "speckle"). Sparkle may be described as a visible, random irregularity in brightness that covers most of the display image area (e.g., the displayed image appears to be covered by small, colored "highlights" that scintillate with movement of the display and/or the observer). The sparkle effect typically results from spatial interference between the pixels of the display and the random surface features of the anti-glare surface. Another display artifact that may be caused by the interaction of the display pixels and the anti-glare surface is a moiré effect, which can be defined as the creation of a new, unwanted pattern (e.g., wavy or meandering patterns) on the display caused by the interaction.

One means of reducing optical artifacts such as sparkle is to add an optical diffuser between the digital display and the anti-glare surface. This anti-sparkle (diffuser) film may be adhered to both the display panel and the anti-glare cover glass. While using a standard surface type or bulk type diffuser may diminish the sparkle effect, it is also likely to reduce image resolution of the display. Such diffusers can reflect ambient light and, ultimately, reduce image contrast. According to some aspects of the present description, an alternative optical film is provided which, when placed between the anti-glare surface and the display, may reduce sparkle and/or moire artifacts, while still providing sufficient display resolution and image contrast.

According to some aspects of the present description, an optical film for reducing at least one of sparkle and moire in a display system includes a structured first major surface (e.g., a surface having structures configured to reduce the optical effects, the surface defined by an x-axis and an orthogonal y-axis). In some embodiments, in at least a first cross-section in a first plane (e.g., the xz-plane of the film) substantially orthogonal to the optical film, the structured first major surface may have a sinusoidal shape having a variable pitch of greater than about 0.5 microns, or about 1 micron, or about 2 microns, or about 4 microns, or about 6 microns, or about 8 microns, or about 10 microns, or about 15 microns, or about 20 microns, or about 30 microns, or about 40 microns, or about 50 microns. In some embodiments, the variable pitch may be substantially random. In some embodiments, the sinusoidal shape of the structured first major surface in the first cross-section may have a repeating pattern of a same group of N first sinusoid structures, where N is greater than or equal to 2. In some such embodiments, N may also be less than or equal to 100, or less than or equal to 80, or less than or equal to 60, or less than or equal to 40, or less than or equal to 20, or less than or equal to 15, or less than or equal to 10. In some embodiments, the variable pitch may be determined from a same predetermined function P (r), where r is a random number with a probability distribution.

In some embodiments, for a substantially normally incident light and for blue, green, and red wavelengths that are at least 50 nm, or at least 60 nm, or at least 70 nm, or at least 80 nm, or at least 90 nm, or at least 100 nm apart from each other and are disposed within respective blue, green, and red wavelength ranges extending respectively from about 420 nm to about 480 nm, from about 490 nm to about 560 nm, and from about 590 nm to about 670 nm, optical transmissions of the optical film versus transmitted angle for the blue, green and red wavelengths may include respective blue, green, and red transmission bands disposed at angles greater than about 1 degree, or about 1.25 degrees, or about 1.5 degrees, or about 1.75 degrees, or about 2 degrees, or about 2.25 degrees, or about 2.5 degrees and having respective blue, green, and red full width at half maxima (FWHMs). In such embodiments, the "transmitted angle" shall be defined as the polar angle with respect to the surface normal.

In some embodiments, at least two of the FWHMs may at least partially overlap (e.g., the blue FWHM and green FWHM may partially overlap, or the green FWHM and red FWHM may partially overlap). In some embodiments, each of the blue, green and red FWHMs may be greater than about 0.5 degrees, or about 0.6 degrees, or about 0.7 degrees, or about 0.8 degrees wide. In some embodiments, the blue and green FWHMs may partially overlap and the green and red FWHMs may partially overlap. In some embodiments, the at least two partially overlapping FWHMs may overlap by at least 0.03 degrees, or at least 0.04 degrees, or at least 0.06 degrees, or at least 0.07 degrees, or at least 0.08 degrees, or at least 0.09 degrees, or at least 0.1 degrees, or at least 0.11 degrees, or at least 0.12 degrees, or at least 0.13 degrees, or at least 0.14 degrees, or at least 0.15 degrees, or at least 0.16 degrees, or at least 0.17 degrees.

In some embodiments, the blue, green and red wavelengths may be approximately 460 nm, 532 nm, and 633 nm, respectively. In some embodiments, the global maximum of each of the blue, green and red transmission bands may be less than about 25%, or less than about 24%, or less than about 23%, or less than about 22%, or less than about 21%, or less than about 20%, or less than about 19%, or less than about 18%, or less than about 17%, or less than about 16%, or less than about 15%.

In some embodiments, the optical film includes a second major surface opposite the structured first major surface. In some such embodiments, the second major surface may be substantially unstructured. In other such embodiments, the second major surface may be a structured second major surface opposite the structured first major surface. In embodiments where the second major surface is a structured second major surface, in at least a second cross-section in a second plane (e.g., the yz-plane) substantially orthogonal to the optical film, the structured second major surface may have a sinusoidal shape having a variable pitch of greater than about 0.5 microns, or about 1 microns, or about 2 microns, or about 4 microns, or about 6 microns, or about 8 microns, or about 10 microns, or about 15 microns, or about 20 microns, or about 30 microns, or about 40 microns, or about 50 microns. In some such embodiments, the first and second planes may be substantially orthogonal to each other.

According to some aspects of the present description, an integral optical construction may include any embodiment of optical film described herein embedded between a first glass substrate and a second glass substrate. In some such embodiments, a first bonding layer may bond the second glass substrate to the optical film. In some such embodiments, the first bonding layer may make physical contact with, and substantially planarize, the structured first major surface of the optical film. In some such embodiments, a magnitude of a difference between indices of refraction of the optical film and the first bonding layer may be greater than about 0.01, or about 0.02, or about 0.04, or about 0.06, or about 0.08, or about 0.1, or about 0.12, or about 0.14, or about 0.16, or about 0.2, or about 0.3, or about 0.4 at at least one of the blue, green and red wavelengths.

According to some aspects of the present description, a display system may include the integral optical construction described herein disposed on a display panel. In some such embodiments, the optical film may include a second major surface opposite the structured first major surface, wherein the second major surface faces the display panel, and wherein the structured first major surface faces away from the display panel. In some such embodiments, a second bonding layer may bond the integral optical construction to the display panel. In some such embodiments, the display panel may be disposed between the integral optical construction and an illumination source (e.g., a backlight) configured to emit light for illuminating the display panel.

In some embodiments of the display system, the integral optical construction may be disposed between a display panel and a polarizing film (e.g., a linear polarizer as might be used with an LCD display, or a circular polarizer as might be used with an OLED display). In such embodiments, it may be advantageous to have low retardation substrates, such as low birefringence polymers including polycarbonate and amorphous polymers such as PMMA, or a copolyester, or a cyclic-olefin copolymer.

In some embodiments, the display system may further include a first prismatic film disposed on the display panel opposite the integral optical construction. In some such embodiments, the first prismatic film may have a plurality of first prisms extending along substantially a same first longitudinal direction (e.g., a y-axis of the first prismatic film). In some such embodiments, the display system may further include a second prismatic film disposed between the display panel and the first prismatic film and including a plurality of second prisms extending along substantially a same second longitudinal direction (e.g., an x-axis orthogonal to the y-axis defined for the first prismatic film) different from the first longitudinal direction.

In some embodiments, the display system may further include an optical diffuser disposed on the display panel opposite the integral optical construction for scattering light incident on the optical diffuser. In some embodiments, the display system may further include a light control film disposed on the display panel opposite the integral optical construction for reducing a cone angle of an incident light upon transmission through the light control film by at least 10 degrees, or at least 15 degrees, or at least 20 degrees. In some embodiments, the display system may further include a reflective polarizer disposed on the display panel opposite the integral optical construction and having a plurality of polymeric layers numbering at least 10, or 20 at least, or 50 at least, or 75 at least, or 100 at least, or 150 at least, or 200 at least, or 250 at least, or 300 at least, or at least 400 in total. In some such embodiments, each of the polymeric layers may have an average thickness of less than about 500 nm, or less than about 400 nm, or less than about 350 nm, or less than about 300 nm, or less than about 250 nm, or less than about 200 nm. In some embodiments, for a substantially normally incident light and each of the blue, green and red wavelengths, the plurality of polymeric layers may reflect more than about 60%, or more than about 70%, or more than about 80%, or more than about 90% of the incident light having an in-plane first polarization state (e.g., the x-axis) and may transmit more than about 60%, or more than about 70%, or more than about 80%, or more than about 90% of the incident light having an in-plane orthogonal second polarization state (e.g., the y-axis).

According to some aspects of the present description, an optical film for reducing at least one of sparkle and moire in a display system includes at least one structured major surface (e.g., a surface having structures configured to reduce optical artifacts). In some embodiments, in at least a first cross-section in a first plane substantially orthogonal to the optical film, the structured major surface may include a repeating pattern of a same group of N first structures, where N is greater than or equal to about 2. In some such embodiments, N may also be less than or equal to about 100, or about 80, or about 60, or about 40, or about 20, or about 15, or about 10. In some embodiments, the N first structures may be arranged in the group at a substantially random spacing S. In some embodiments, each of at least a majority of the first structures in the N first structures may have a sinusoidal shape.

In some embodiments, the random spacing S may have values in a range from about 0.5 microns to about 500 microns and may be determined from a same predetermined function S(r), where r is a random number with a probability distribution. In some embodiments, the probability distribution may be a uniform probability distribution. In some embodiments, the random number r may have a value between zero and one. In some embodiments, the random number r may be produced by a function f(r) which is a linear function of r.

In some embodiments, for a substantially normally incident light and blue, green, and red wavelengths that are at least 50 nm, or at least 60 nm, or at least 70 nm, or at least 80 nm, or at least 90 nm, or at least 100 nm apart from each other and disposed within respective blue, green, and red wavelength ranges extending respectively from about 420 nm to about 480 nm, about 490 nm to about 560 nm, and about 590 nm to about 670 nm, optical transmissions of the optical film versus transmitted angle for the blue, green, and red wavelengths may have respective blue, green, and red transmission bands disposed at angles greater than about 1 degree and having respective blue, green, and red full width at half maxima (FWHMs), at least two of which at least partially overlap.

According to some aspects of the present description, an optical film for reducing at least one unwanted optical artifact (e.g., sparkle or moiré) in a display system includes at least one structured major surface. In some embodiments, the at least one structured major surface, in at least a first cross-section in a first plane (e.g., in an xz-plane including the structured major surface) substantially orthogonal to the optical film, may include a repeating pattern of a same group of N first structures. In some embodiments, N may be greater than or equal to about 2 and N may also be less than or equal to about 100, or about 80, or about 60, or about 40, or about 20, or about 15, or about 10. In some embodiments, the N first structures may be arranged in the group at spacings in a range from about 0.5 microns to about 500 microns. In some embodiments, the spacing between each pair of adjacent structures in the group is K*ΔS microns, where ΔS may be a constant greater than about 0.5, or greater than about 1, or greater than about 2, or greater than about 4, or greater than about 6, or greater than about 8, or greater than about 10, or greater than about 15, or greater than about 20, or greater than about 30, or greater than about 40, or greater than about 50, and K may be an integer randomly chosen between 1 and N−1, wherein K is different for each pair of adjacent structures in the group. In some embodiments, for a substantially normally incident light and blue, green, and red wavelengths that are at least 50 nm, or at least 60 nm, or at least 70 nm, or at least 80 nm, or at least 90 nm, or at least 100 nm apart from each other and are disposed within respective blue, green, and red wavelength ranges extending respectively from about 420 nm to about 480 nm, about 490 nm to about 560 nm, and about 590 nm to about 670 nm, optical transmissions of the optical film versus transmitted angle for the blue, green, and red wavelengths may include respective blue, green, and red transmission bands disposed at angles greater than about 1 degree and having respective blue, green, and red full width at half maxima (FWHMs). In some embodiments, at least 20%, or at least 25%, or at least 30%, or at least 35%, or at least 40% of the green FWHM may overlap each of the blue and red FWHMs. In some embodiments, the blue FWHM may also overlap the red FWHM.

Turning now to the figures, FIG. 1 is a side view of a display system including an optical film for reducing optical artifacts in a display system, according to an embodiment of the present description. In some embodiments, display system 200 includes an optical film 100 configured to reduce an unwanted optical artifact, such as optical sparkle or moiré, in the display system 200. In some embodiments, optical film 100 includes a structured first major surface 10 and a second major surface 11. In some embodiments, second major surface 11 may be substantially planar (i.e., flat, unstructured). In other embodiments, second major surface may be structured (see, e.g., structured second major surface 11' of FIG. 2). In some embodiments, structured first major surface 10 may have a sinusoidal shape having a variable pitch, as seen in a first cross-section of the surface (as will be discussed in additional detail in the discussion of FIGS. 3A and 3B, as well as FIGS. 4A, 4B, 7A, and 7B elsewhere herein). In some embodiments, the variable pitch of the structured first major surface may be greater than about 0.5 microns, or 1 micron, or 2 microns, or 4 microns, or 6 microns, or 8 microns, or 10 microns, or 15 microns, or 20 microns, or 30 microns, or 40 microns, or 50 microns. In some embodiments, the variable pitch may be substantially random. As will be discussed herein, the sinusoidal shape and variable pitch of the structured first major surface 10 may reduce sparkle and/or moiré artifacts, while still provided sufficient display resolution and image contrast.

In some embodiments, optical film 100 may be part of an integral optical construction 300. In some embodiments, integral optical construction 300 includes the optical film 100 embedded between a first glass substrate 40 and a second glass substrate 41. In some embodiments, the first glass substrate 40 (or any external films or layers 43, such as a polarizing or other film) may have an antiglare coating or layer 42. In some embodiments, optical film 100 may be bonded to the second glass substrate 41 by a first bonding layer 50. In some such embodiments, the first bonding layer 50 may make physical contact with, and substantially planarize, the structured first major surface 10 of optical film 100.

Figure 6:
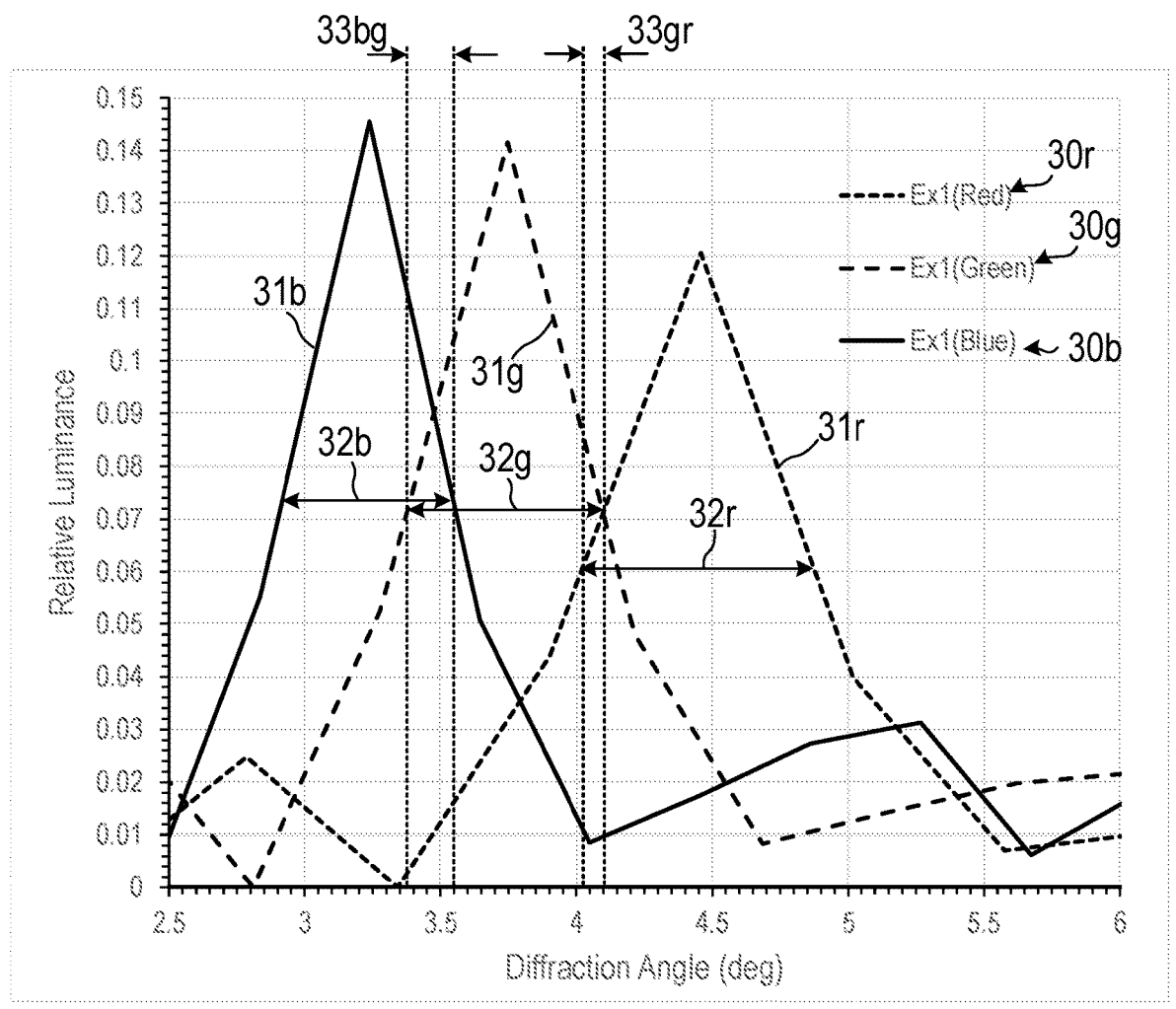
FIG. 6 is a graph plotting the relative luminance of the optical film of FIGS. 4A and 4B, in accordance with an embodiment of the present description.
Figure 9:
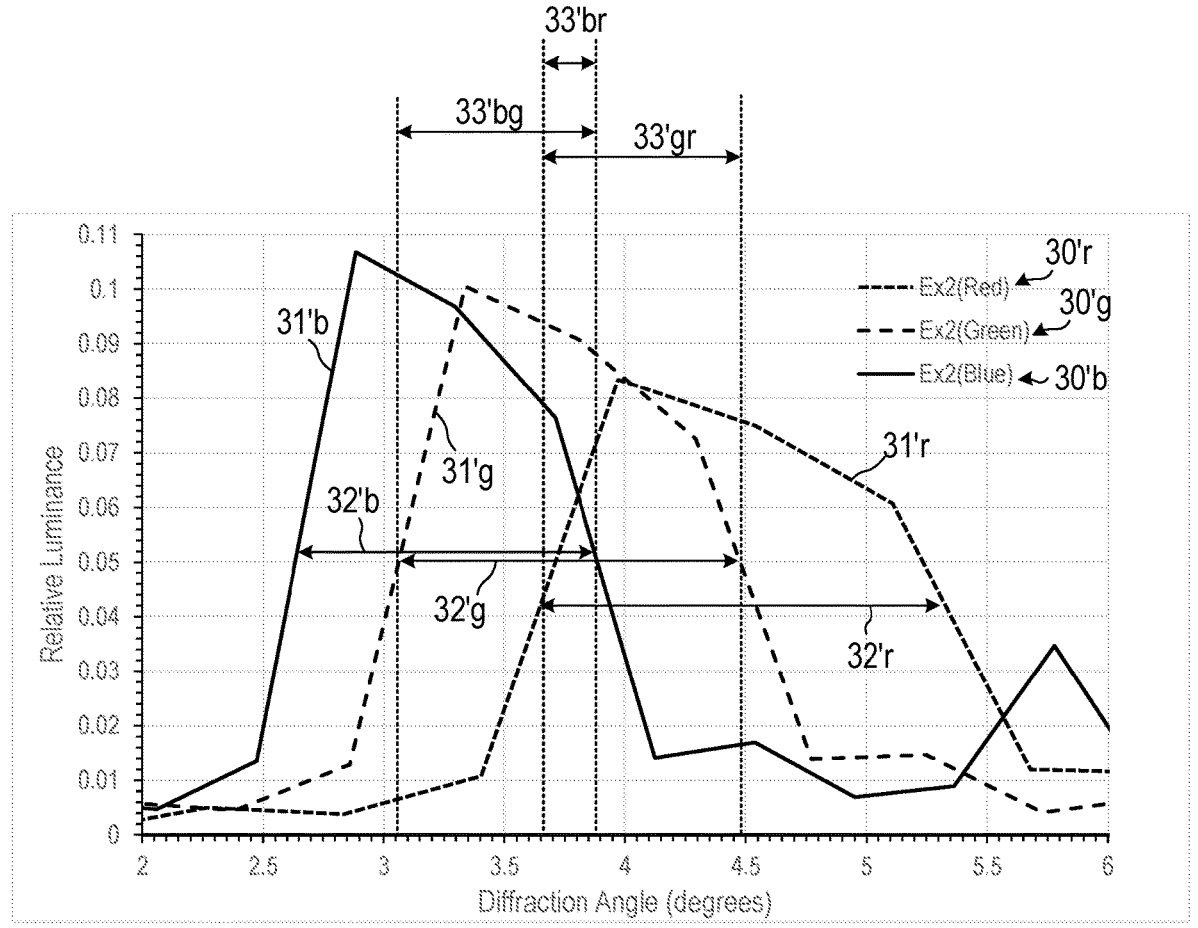
FIG. 9 is a graph plotting the relative luminance of the optical film of FIGS. 7A and 7B, in accordance with an embodiment of the present description.

In some such embodiments, the magnitude of the difference between indices of refraction of optical film 100 and first bonding layer 50 may be greater than about 0.01, or about 0.02, or about 0.04, or about 0.06, or about 0.08, or about 0.1, or about 0.12, or about 0.14, or about 0.16, or about 0.2, or about 0.3, or about 0.4 at at least one of a blue, a green, and a red wavelength (see, e.g., discussions of blue, green, and red transmission bands in FIGS. 6 and 9 elsewhere herein).

In some embodiments, the integral optical construction 300 of display system 200 may be disposed on a display panel 60. In such embodiments, the second major surface 11 of optical film 100 may face display panel 60, and the structured first major surface 10 may face away from display panel 60. In some such embodiments, the integral optical construction 300 may be bonded to the display panel 60 by a second bonding layer 51. In some embodiments, display panel 60 may be disposed between the integral optical construction 300 and an illumination source 80 (e.g., a backlight, such as an array of light-emitting diodes) configured to emit light 81 for illuminating display panel 60. In some embodiments, display system 200 may further comprise a first prismatic film (e.g., a brightness enhancement film) 90 disposed on or near display panel 60 opposite integral optical construction 300. In some embodiments, first prismatic film 90 may include a plurality of first prisms 91 (e.g., linear prisms) extending along substantially a same first longitudinal axis (e.g., the y-axis as shown in FIG. 1). In some embodiments, display system 200 may further comprise a second prismatic film (e.g., a second brightness enhancement film) 92 disposed between display panel 60 and first prismatic film 90. In some embodiments, second prismatic film 92 may include a plurality of second prisms 93 (e.g., linear prisms) extending along substantially a same second longitudinal axis different from the first longitudinal axis (e.g., the x-axis as shown in FIG. 1).

In some embodiments, display system 200 may further include an optical diffuser 110 disposed on or near display panel 60 opposite the integral optical construction 300 for scattering light 81 incident on optical diffuser 110. In some embodiments, display system 200 may further include a light control film 120 (e.g., a light collimating film) disposed on or near display panel 60 opposite integral optical construction 300 for reducing a cone angle of an incident light upon transmission through light control film 120 by at least 10, degrees, or at least 15 degrees, or at least 20 degrees.

In some embodiments, display system 200 may further include a reflective polarizer 130 disposed on or near display panel 60 opposite integral optical construction 300. In some embodiments, reflective polarizer 130 may include a plurality of polymeric layers 131 numbering at least 10, or at least 20, or at least 50, or at least 75, or at least 100, or at least 150, or at least 200, or at least 250, or at least 300, or at least 400 in total. In some such embodiments, each of the polymeric layers may have an average thickness of less than about 500 nm, or 400 nm, or 350 nm, or 300 nm, or 250 nm, or 200 nm, such that for a substantially normally incident light and each of the blue, green and red wavelengths. In some embodiments, the plurality of polymeric layers 131 may reflect more than about 60%, or more than about 70%, or more than about 80%, or more than about 90% of the incident light 81 having an in-plane first polarization state (e.g., light polarized along an x-axis of the reflective polarizer 130) and may transmit more than about 60%, or more than about 70%, or more than about 80%, or more than about 90% of the incident light 81 having an in-plane orthogonal second polarization state (e.g., light polarized along a y-axis of the reflective polarizer 130).

Figure 2:
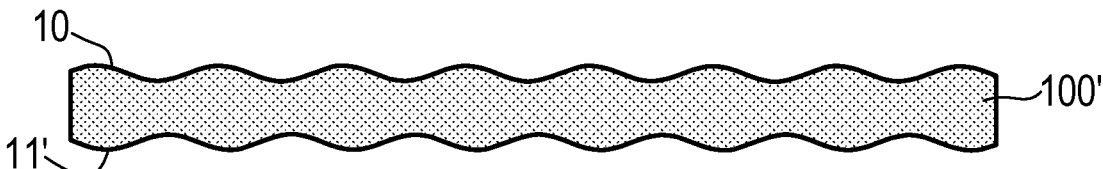
FIG. 2 is a side view of an optical film for reducing optical artifacts in a display system, in accordance with an alternate embodiment of the present description.

FIG. 2 is a side view of an alternate embodiment of the optical film for reducing optical artifacts in a display system of FIG. 1. In some embodiments, optical film 100' may have a structured first major surface 10 and a structured second major surface 11'.

In some embodiments, structured second major surface 11' may have a sinusoidal shape having a variable pitch, as seen in a second cross-section of the surface (different from the first cross-section discussed previously herein). For example, the first cross-section may be a cross-section seen in a first plane (e.g., the xz-plane, as defined by the coordinate system in FIG. 1) which is substantially orthogonal to the optical film 100', and the second cross-section may be a cross-section seen in a second plane (e.g., the yz-plane of FIG. 1) substantially orthogonal to the optical film 100'. That is, the first plane and the second plane may also be substantially orthogonal to each other as well as to the optical film 100'.

In some embodiments, the variable pitch of the structured second major surface may be greater than about 0.5 microns, or 1 micron, or 2 microns, or 4 microns, or 6 microns, or 8 microns, or 10 microns, or 15 microns, or 20 microns, or 30 microns, or 40 microns, or 50 microns. In some embodiments, the variable pitch may be substantially random.

Figures 3A, 3B, 3C:
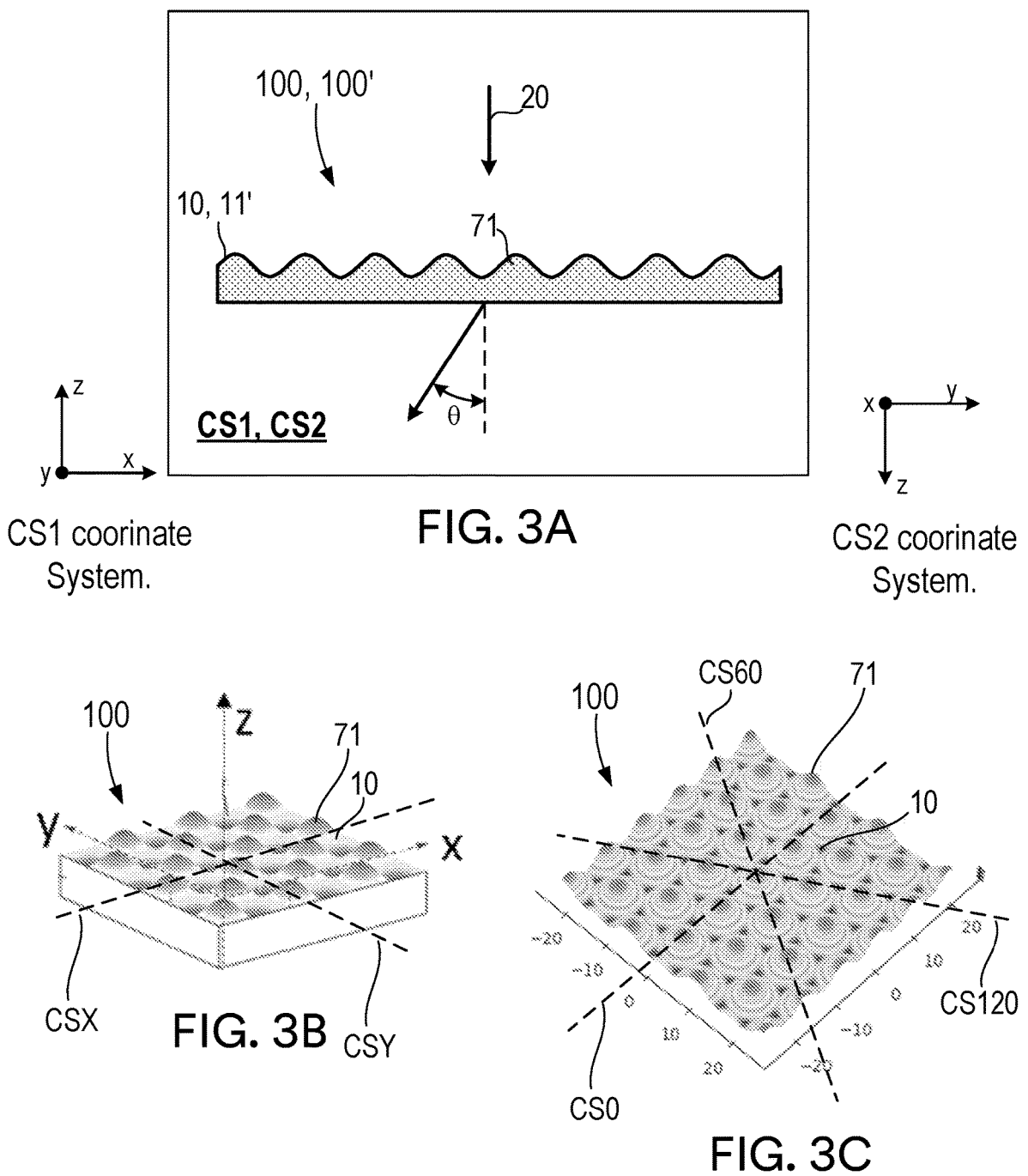
FIGS. 3A-3C provide additional details of an optical film for reducing optical artifacts in a display system, in accordance with an embodiment of the present description.

Additional details of the first cross-section and second cross-section will be discussed in the discussion of FIGS. 3A-3C, as well as FIGS. 4A, 4B, 7A, and 7B elsewhere herein. Turning first to FIGS. 3A-3C, these figures present additional details and views of an embodiment of an optical film 100 for reducing optical artifacts in a display system. FIG. 3A is a cross-section CS1 of the structured first major surface 10 of optical film 100 of FIG. 1, such as the first cross-section described previously herein. Cross-section CS1 is shown in FIG. 3A as extending through a first plane (xz-plane) as defined by the CS1 coordinate system shown on the left side of FIG. 3A. FIG. 3A can also represent a second cross-section CS2 of the structured second major surface 11' of optical film 100' of FIG. 2, where second cross-section CS2 extends through a second plane (yz-plane) as defined by the CS2 coordinate system shown on the right side of FIG. 3A. That is, FIG. 3A describes a sinusoidal cross-section which can describe both structured first major surface 10 and (when present) structured second major surface 11'. It should be noted that FIG. 3A is representative only, illustrating the sinusoidal nature of the cross-sections CS1 and CS2, and is not intended to show the variable and/or random pitch of either sinusoidal shape. In some embodiments, structured first major section 10 and structured second major surface 11' may use different arrangements and/or pitches of their respective sinusoidal cross-sectional shapes.

In some embodiments, the sinusoidal shape of structured first major surface 10 may include a repeating pattern of a same group of N first sinusoid structures 71. For instance, N may be a number greater than or equal to 2 and less than or equal to about 100, or less than or equal to about 80, or less than or equal to about 60, or less than or equal to about 40, or less than or equal to about 20, or less than or equal to about 15, or less than or equal to about 10.

It should be noted that the cross-section CS1 may represent a cross-section taken through multiple different directions of the film. For example, in the perspective view of structured first major surface 10 of optical film 100 shown in FIG. 3B, the cross-section CS1 may be taken parallel to the x-axis (CSX) of FIG. 3B as well as parallel to the y-axis (CSY) of FIG. 3B. That is, a sinusoidal pattern as discussed herein may be applied to and exhibited in more than just one direction or axis of the x-y plane of optical film 100. In some embodiments, such as the hexagonal arrangement shown in FIG. 3C, the cross-section exhibiting the varying sinusoidal pitch may be seen in three different axes separated by 60 degrees, as shown by the dashed lines labeled CS0, CS60, and CS120 in FIG. 3C. Other arrangements of structures 71 and other cross-sections may be possible within the scope of the present description.

There are various ways to determine the spacing and/or pitch of the sinusoid structures 71. For example, in a first type of arrangement (Type 1, for the purposes of this discussion), a group of N structures may be arranged such that a spacing S between adjacent structures is determined from a same predetermined function P(r), where r is a random number with a probability distribution. In another example, in a second type of arrangement (Type 2), a spacing range may be divided into N equal sections to get N−1 different spacings, S(1) through S(N−1), and assign the N−1 different spacings randomly to different pairs of adjacent structures. Other arrangements and pitches, beyond the Type 1 and Type 2 arrangements discussed herein are possible, and the following discussion is not intended to be limiting.

Figure 4A:
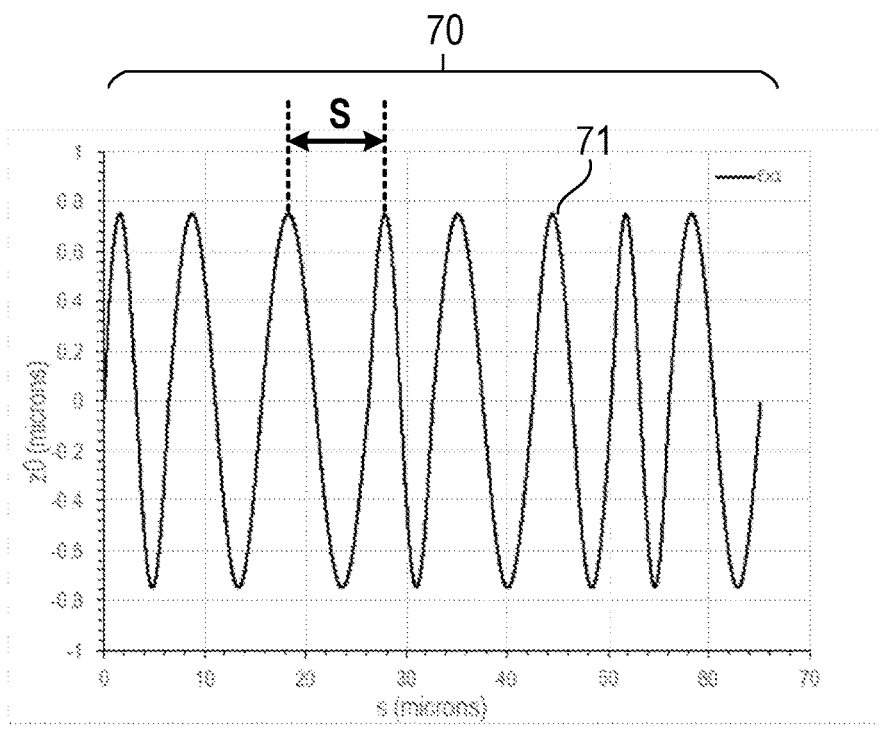
FIGS. 4A and 4B provide details on the profile of an optical film for reducing optical artifacts in a display system, in accordance with an embodiment of the present description.
Figure 4B:
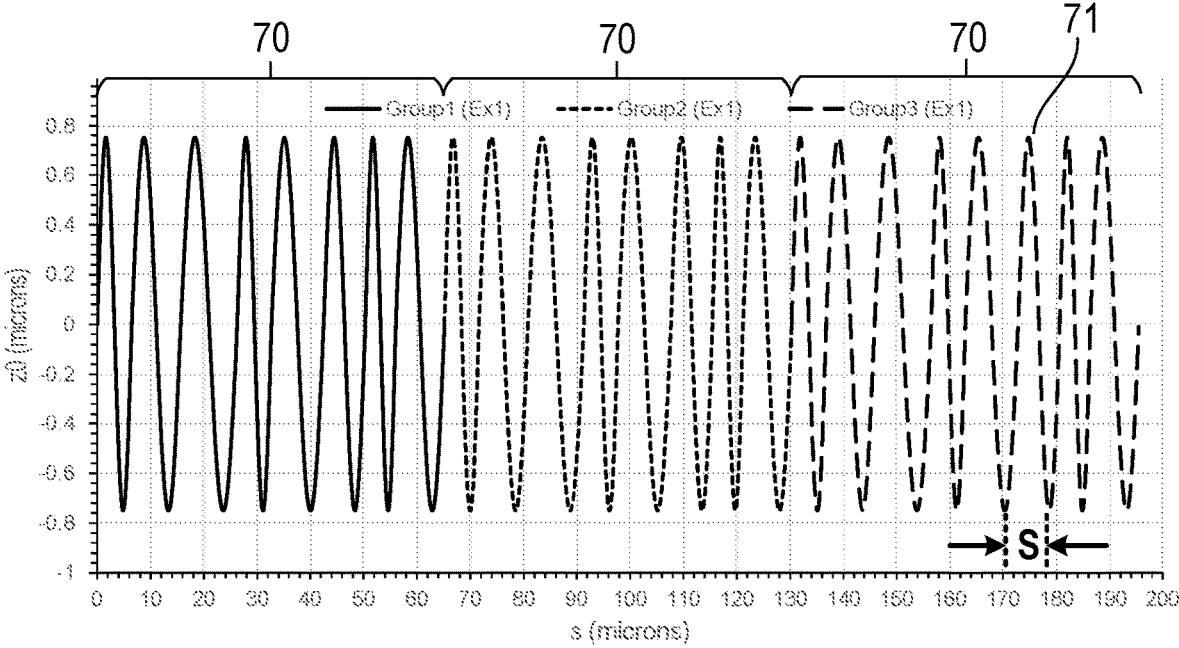

FIGS. 4A, 4B, 5, and 6 provide additional details of the Type 1 embodiment for the optical film 100, and FIGS. 7A, 7B, 8A, 8B, and 9 (discussed elsewhere herein) provide additional details of the Type 2 embodiment. FIG. 4A provides a plot showing a sinusoidal shape of a group 70 including 8 first sinusoid structures 71 (i.e., N for this group is 8). In this embodiment, the variable spacing S (i.e., the variable pitch) between adjacent structures 71 of the group 70 is chosen from a predetermined range having a width 2g, centered on S0, and extending from Sa to Sb, using the equation:

$$S(r)=S0[1+2g(r-\tfrac{1}{2})]$$

where g is a fixed number between 0 and 1, and r is a random number between 0 and 1 from a probability function f(r). A plot showing the profile generated for a group 70 of N structures 71 (in this example, N=8) using this formulaic approach is given in FIG. 4A. In some embodiments, once a group 70 is determined, this group 80 of N structures 71 is repeated along the film, as shown by the plot shown in FIG. 4B, showing three groups 70 repeated along the optical film (i.e., in this embodiment, each group 70 of structures 71 has the same variable spacing as each other group 70 of structure 71 repeated along the film. In some embodiments, N may be greater than or equal to 2 and less than or equal to 100, or less than or equal to 80, or less than or equal to 60, or less than or equal to 40, or less than or equal to 20, or less than or equal to 15, or less than or equal to 10.

FIG. 5 shows an example placement and spacing of structures on an optical film, using the formula S(r) as described above, and as shown in FIG. 5. The variable spacing is shown for a predetermined range having a width 2g, centered on S0, and extending from Sa to Sb. Spacings S1 through S6 are derived using the formula S(r)=S0[1+2g (r−½)] and used to space the 8 structures between and including position Sa and Sb.

Figure 5:
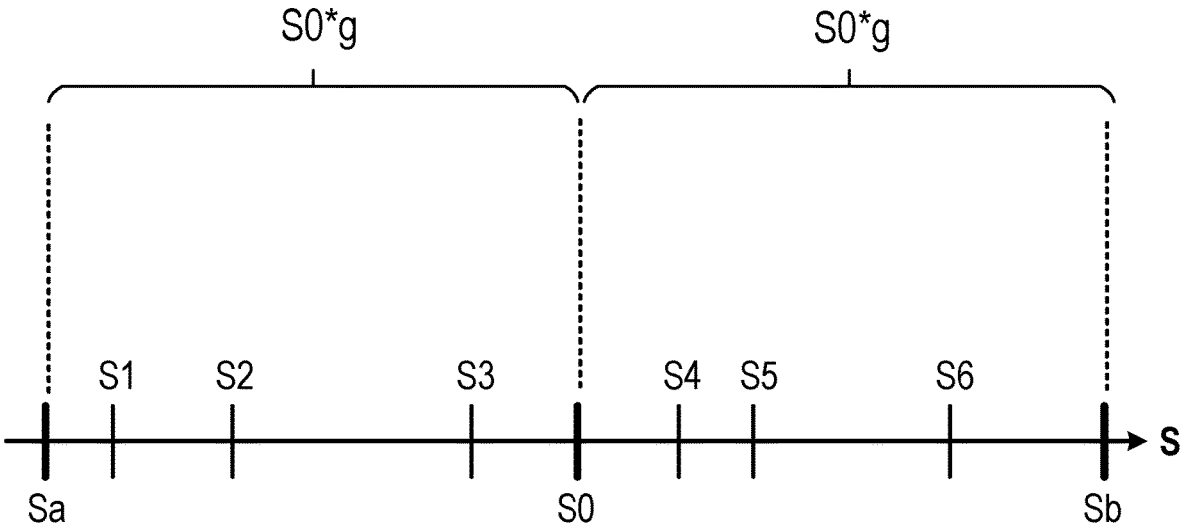
FIG. 5 shows the placement and spacing of structures on an optical film, in accordance with an embodiment of the present description.

FIG. 6 is a graph plotting the relative luminance of the optical film represented in FIGS. 4A, 4B, and 5 (i.e., a "Type 1" optical film). FIG. 6 shows plots of optical transmissions of the optical film (e.g., optical film 100 of FIG. 1) for a substantially normally incident light (such as normally incident light 20 of FIG. 3A) versus transmitted angle (such as transmitted angle θ of FIG. 3A) for each of blue, green, and red wavelength ranges. In some embodiments, the substantially normally incident lights may include a blue wavelength, a green wavelength, and a red wavelength that are at least 50 nm, or at least 60 nm, or at least 70 nm, or at least 80 nm, or at least 90 nm, or at least 100 nm apart from each other. For example, the blue wavelength may be about 460 nm, the green wavelength may be about 532 nm, and the red wavelength may be about 633 nm.

Optical transmission 30b is the optical transmission for blue wavelengths (including the blue wavelength described above) from about 420 nm to about 480 nm. Optical transmission 30g is the optical transmission for green wavelengths (including the green wavelength described above) from about 490 nm to about 560 nm. Optical transmission 30r is the optical transmission for red wavelengths (including the red wavelength described above) from about 590 nm to about 670 nm. Optical transmissions 30b, 30g, and 30r include respective transmission bands for blue 31b, green 31g, and red 31r which are disposed at angles greater than about 1 degree, or greater than about 1.25 degrees, or greater than about 1.5 degrees, or greater than about 1.75 degrees, or greater than about 2 degrees, or greater than about 2.25 degrees, or greater than about 2.5 degrees (as shown on the x-axis of FIG. 6). Each of transmission bands 31$b$, 31$g$, and 31$r$ have respective full width at half maxima (FWHMs) 32$b$ (blue), 32$g$ (green), and 32$r$ (red). In some embodiments, at least two of the FWHMs at least partially overlap. For example, blue FWHM 32$b$ and green FWHM 32$g$ overlap in the area marked 33$bg$, and green FWHM 32$g$ and red FWHM 32$r$ overlap in the area marked 33$gr$. At least one effect of the optical films described herein is the creation of these transmission bands representing blue, green, and red such that they at least partially overlap. That is, rather than having three clearly separated transmission bands for blue, green, and red (causing visibly separated color artifacts, or "sparkle", on the display), the transmission bands are "pushed together" such that they overlap, reducing the separation of color and the resulting optical artifacts such as sparkle.

In some embodiments, the at least two partially overlapping FWHMs may overlap by at least 0.03 degrees, or 0.04 degrees, or 0.06 degrees, or 0.07 degrees, or 0.08 degrees, or 0.09 degrees, or 0.1 degrees, or 0.11 degrees, or 0.12 degrees, or 0.13 degrees, or 0.14 degrees, or 0.15 degrees, or 0.16 degrees, or 0.17 degrees. In some embodiments, each of the blue (32$b$), green (32$g$), and red (32$r$) FWHMs may be greater than about 0.5 degrees, or greater than about 0.6 degrees, or greater than about 0.7 degrees, or greater than about 0.8 degrees wide.

In some embodiments, a global maximum of each of the blue (31$b$), green (31$g$), and red (31$r$) transmission bands may be less than about 25% (or 0.25 relative luminance, as shown on the y-axis of FIG. 6), or less than about 24%, or less than about 23%, or less than about 22%, or less than about 21%, or less than about 20%, or less than about 19%, or less than about 18%, or less than about 17%, or less than about 16%, or less than about 15% (or 0.15 relative luminance).

Figure 7A:
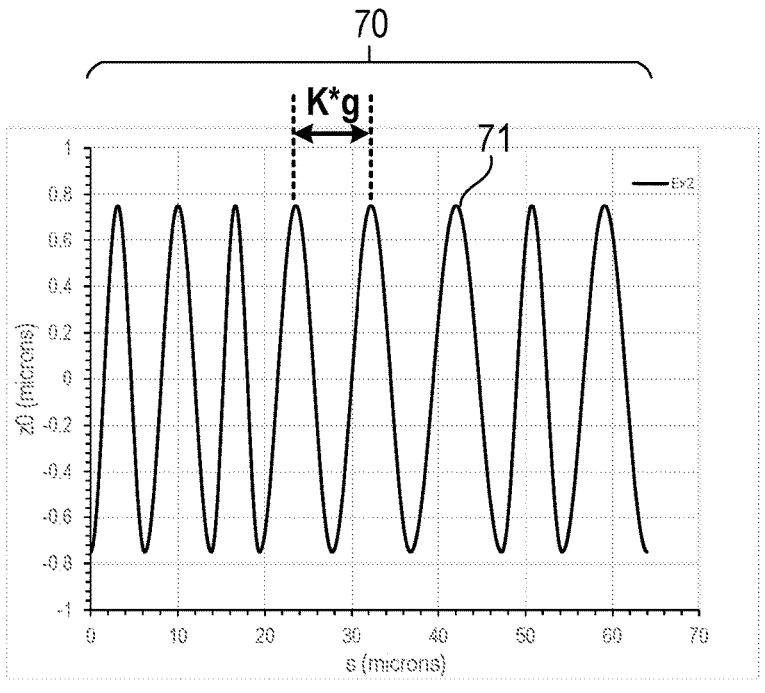
FIGS. 7A and 7B provide details on the profile of an optical film for reducing optical artifacts in a display system, in accordance with an alternate embodiment of the present description.
Figure 7B:
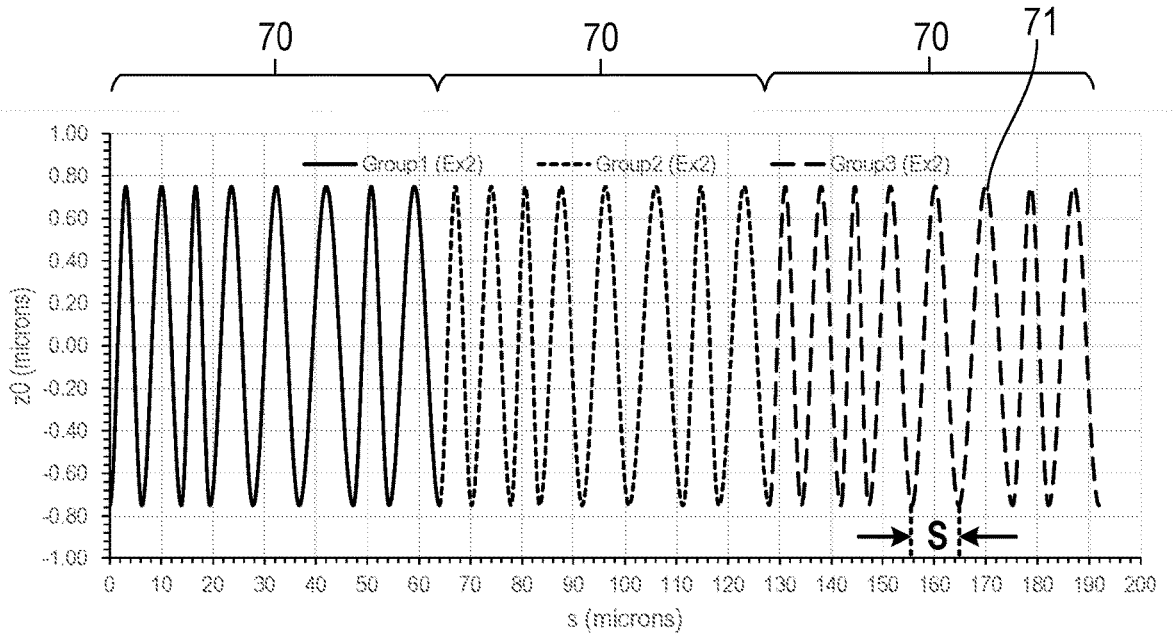

FIGS. 7A, 7B, 8A, 8B, and 9 provide additional details of the Type 2 embodiment. FIGS. 7A and 7B are similar to FIGS. 4A and 4B in that they show the sinusoidal profile of a group 70 of N structures 71 (where N=8, as shown in FIG. 7A) and an end-to-end arrangement of 3 identical groups 70 of N structures across the film (as shown in FIG. 7B). The difference between FIGS. 7A and 7B and previously discussed FIGS. 4A and 4B is in the method used for determining the spacing S used between adjacent pairs of structures 71. The spacing between adjacent nodes is labeled as K*g in FIG. 7A. This spacing can be best understood by looking at FIGS. 8A and 8B.

Figure 8A:
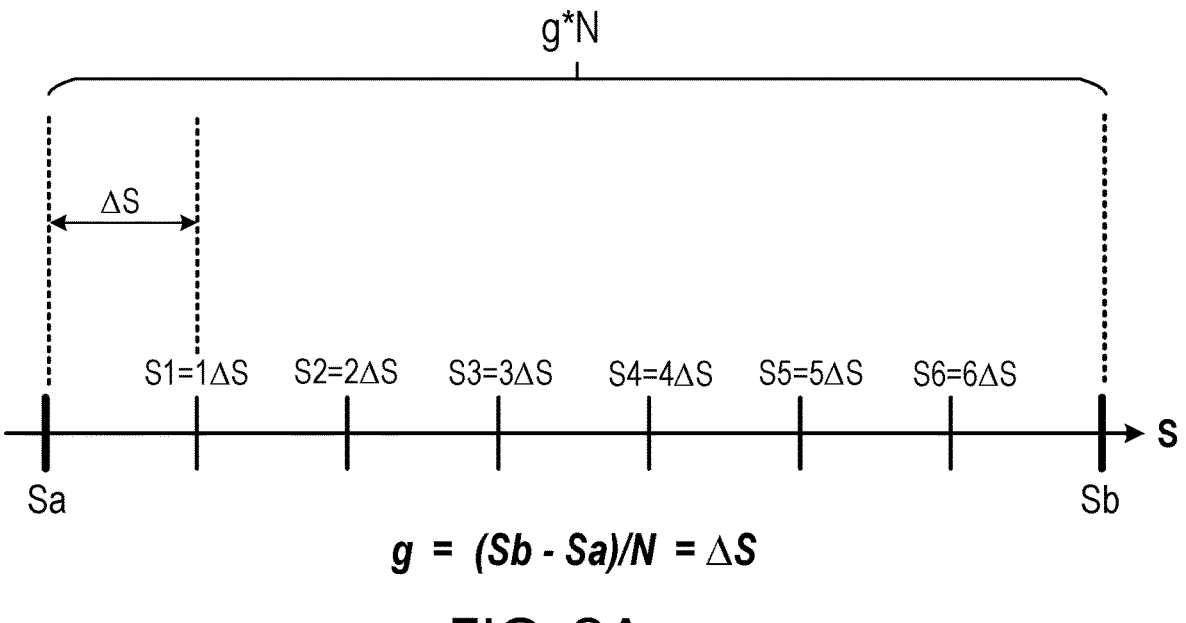
FIGS. 8A and 8*b* provide details on the placement and spacing of structures on an optical film, in accordance with an alternate embodiment of the present description.

The Type 2 embodiment starts by choosing N structures from a spacing range extending from Sa to Sb, as shown in FIG. 8A. In some embodiments, N may be greater than or equal to 2 and less than or equal to about 100, or less than or equal 80, or less than or equal 60, or less than or equal 40, or less than or equal 20, or less than or equal 15, or less than or equal 10. In this example, 7 was chosen as the value of N (i.e, the group of structures contains 7 structures). The spacing range was divided into N equal sections to produce N−1 different spacings, labeled S(1) through S(N−1). In some embodiments, the spacings may be in a range from about 0.5 microns to about 500 microns.

Since N is 7 in this example, the spacing range extending from Sa to Sb is divided into 7 equal sections. As the sections are all equal in size (each having a width of g, or ΔS, as shown by the formula in FIG. 8A), six different spacings are created, S1 through S6, and each spacing is a multiple of ΔS. For example, S1 is equal to 1*ΔS, S2 is equal to 2*ΔS, and so on, until S6, which is equal to 6*ΔS. Spacing S6 is therefore 6 times the width of spacing S1, S4 is 4 times the spacing of S1, and so on. These spacings, unlike the spacings in the Type 1 embodiment, are not random spacings, but based on a linear progression of sizes from S1 to S6.

Figure 8B:
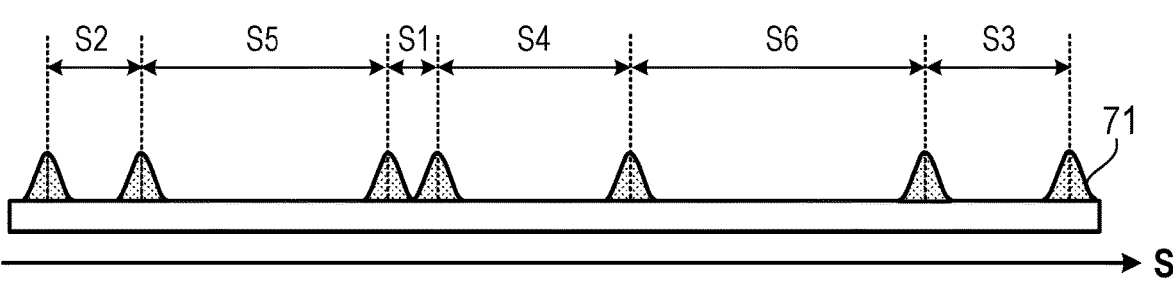

The randomization component in Type 2 comes in the random arrangement of the spacings S1 through S6, as shown in FIG. 8B. That is, each of the N−1 different spacings is randomly assigned to a different pair of adjacent structures 71. As shown by the formula in FIG. 8B, the spacing between each pair of adjacent structures in the group is determined by K*ΔS microns, where ΔS is a constant greater than about 0.5, or about 1, or about 2, or about 4, or about 6, or about 8, or about 10, or about 15, or about 20, or about 30, or about 40, or about 50, and K is an integer randomly chosen between 1 and N−1. In this embodiment, K must be different for each pair of adjacent structures in the group. In this case, as shown in FIG. 8B, the spacings S1 through S6, which were created as shown in FIG. 8A, were assigned in the randomly selected order S2, S5, S1, S4, S6, S3, as shown in FIG. 8B.

This method (Type 2) of arranging structures 71 may result in an improved performance relative to the reduction of sparkle and other optical artifacts seen by the Type 1 method, in some embodiments. For example, the optical performance of one embodiment of the Type 2 arrangement is shown in FIG. 9. FIG. 9 is a graph plotting the relative luminance of the optical film of FIGS. 7A, 7B, and 8 using the Type 2 arrangement of structures. FIG. 9 shows plots of optical transmissions of the optical film (e.g., optical film 100 of FIG. 1) for a substantially normally incident light (such as normally incident light 20 of FIG. 3A) versus transmitted angle (such as transmitted angle θ of FIG. 3A) for each of blue, green, and red wavelength ranges. In some embodiments, the substantially normally incident lights may include a blue wavelength, a green wavelength, and a red wavelength that are at least 50 nm, or at least 60 nm, or at least 70 nm, or at least 80 nm, or at least 90 nm, or at least 100 nm apart from each other. For example, the blue wavelength may be about 460 nm, the green wavelength may be about 532 nm, and the red wavelength may be about 633 nm.

Optical transmission 30'$b$ is the optical transmission for blue wavelengths (including the blue wavelength described above) from about 420 nm to about 480 nm. Optical transmission 30'$g$ is the optical transmission for green wavelengths (including the green wavelength described above) from about 490 nm to about 560 nm. Optical transmission 30'$r$ is the optical transmission for red wavelengths (including the red wavelength described above) from about 590 nm to about 670 nm. Optical transmissions 30'$b$, 30'$g$, and 30'$r$ include respective transmission bands for blue 31'$b$, green 31'$g$, and red 31'$r$ which are disposed at angles greater than about 1 degree, or greater than about 1.25 degrees, or greater than about 1.5 degrees, or greater than about 1.75 degrees, or greater than about 2 degrees, or greater than about 2.25 degrees, or greater than about 2.5 degrees (as shown on the x-axis of FIG. 9). Each of transmission bands 31'$b$, 31'$g$, and 31'$r$ have respective full width at half maxima (FWHMs) 32'$b$ (blue), 32'$g$ (green), and 32'$r$ (red). In some embodiments, at least two of the FWHMs at least partially overlap. For example, blue FWHM 32$b$ and green FWHM 32$g$ overlap in the area marked 33$bg$, and green FWHM 32$g$ and red FWHM 32$r$ overlap in the area marked 33$gr$.

In some embodiments, for example, at least 20%, or at least 25%, or at least 30%, or at least 35%, or at least 40% of the green FWHM 32'g overlaps each of the blue FWHM 32'b (see 33'bg) and red FWHM 32'r (see 33'gr). In some embodiments, at least a portion of the blue FWHM 32'b may also overlap a portion of the red FWHM 32'r (see 33'br).

When the plots of FIG. 9 (Type 2 arrangement) are compared to the plots of FIG. 6 (Type 1 arrangement), the three FWHMs in FIG. 9 overlap a greater amount that the corresponding FWHMs in FIG. 6. That is, the transmission bands representing blue, green, and red are more "pushed together" in FIG. 9 than in FIG. 6, reducing the separation of color and the related optical artifacts such as sparkle. It should be noted that the types of optical films described herein are examples of different types and methods of arranging structures on an optical film for the reduction of optical artifacts and are not meant to be limiting in any way. Different methods of randomization of the arrangement and spacings of the sinusoidal structures are possible within the scope of the description, and other arrangements may result in different optical performances beyond those shown in FIGS. 6 and 9.

Terms such as "about" will be understood in the context in which they are used and described in the present description by one of ordinary skill in the art. If the use of "about" as applied to quantities expressing feature sizes, amounts, and physical properties is not otherwise clear to one of ordinary skill in the art in the context in which it is used and described in the present description, "about" will be understood to mean within 10 percent of the specified value. A quantity given as about a specified value can be precisely the specified value. For example, if it is not otherwise clear to one of ordinary skill in the art in the context in which it is used and described in the present description, a quantity having a value of about 1, means that the quantity has a value between 0.9 and 1.1, and that the value could be 1.

Terms such as "substantially" will be understood in the context in which they are used and described in the present description by one of ordinary skill in the art. If the use of "substantially equal" is not otherwise clear to one of ordinary skill in the art in the context in which it is used and described in the present description, "substantially equal" will mean about equal where about is as described above. If the use of "substantially parallel" is not otherwise clear to one of ordinary skill in the art in the context in which it is used and described in the present description, "substantially parallel" will mean within 30 degrees of parallel. Directions or surfaces described as substantially parallel to one another may, in some embodiments, be within 20 degrees, or within 10 degrees of parallel, or may be parallel or nominally parallel. If the use of "substantially aligned" is not otherwise clear to one of ordinary skill in the art in the context in which it is used and described in the present description, "substantially aligned" will mean aligned to within 20% of a width of the objects being aligned. Objects described as substantially aligned may, in some embodiments, be aligned to within 10% or to within 5% of a width of the objects being aligned.

All references, patents, and patent applications referenced in the foregoing are hereby incorporated herein by reference in their entirety in a consistent manner. In the event of inconsistencies or contradictions between portions of the incorporated references and this application, the information in the preceding description shall control.

Descriptions for elements in figures should be understood to apply equally to corresponding elements in other figures, unless indicated otherwise. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed:

1. An optical film for reducing at least one of sparkle and moire in a display system, the optical film comprising a structured first major surface that in at least a first cross-section in a first plane substantially orthogonal to the optical film has a sinusoidal shape having a variable pitch of greater than about 0.5 microns, such that for a substantially normally incident light and blue, green, and red wavelengths that are at least 50 nm apart from each other and are disposed within respective blue, green and red wavelength ranges extending respectively from about 420 nm to about 480 nm, about 490 nm to about 560 nm, and about 590 nm to about 670 nm, optical transmissions of the optical film versus transmitted angle for the blue, green and red wavelengths comprise respective blue, green, and red transmission bands disposed at angles greater than about 1 degree and having respective blue, green, and red full width at half maxima (FWHMs), at least two of which at least partially overlap.

2. The optical film of claim 1, wherein the variable pitch is substantially random.

3. The optical film of claim 1, wherein the sinusoidal shape of the structured first major surface in the first cross-section comprises a repeating pattern of a same group of N first sinusoid structures, such that $N \geq 2$.

4. The optical film of claim 3, wherein the sinusoidal shape of the structured first major surface in the first cross-section comprises a repeating pattern of a same group of N first sinusoid structures, such that $N \leq 100$.

5. The optical film of claim 1, wherein the variable pitch is determined from a same predetermined function P(r), r a random number with a probability distribution.

6. The optical film of claim 1, wherein the blue, green and red wavelengths are approximately 460, 532 and 633 nm, respectively.

7. The optical film of claim 1, wherein a global maximum of each of the blue, green and red transmission bands is less than about 25%.

8. The optical film of claim 1, wherein each of the blue, green and red FWHMs is greater than about 0.5 degrees wide.

9. The optical film of claim 1, wherein the blue and green FWHMs partially overlap and the green and red FWHMs partially overlap.

10. The optical film of claim 1 comprising a structured second major surface opposite the structured first major surface.

11. The optical film of claim 10, wherein in at least a second cross-section in a second plane substantially orthogonal to the optical film, the structured second major surface has a sinusoidal shape having a variable pitch of greater than about 0.5 microns.

12. The optical film of claim 11, wherein the first and second planes are substantially orthogonal to each other.

13. An integral optical construction comprising the optical film of claim 1 embedded between first and second glass substrates.

14. A display system comprising the integral optical construction of claim 13 disposed on a display panel.

15. A display system comprising the integral optical construction of claim 13 disposed between a display panel and a polarizing film.

16. An optical film for reducing at least one of sparkle and moire in a display system, the optical film comprising at least one structured major surface that in at least a first cross-section in a first plane substantially orthogonal to the optical film, comprises a repeating pattern of a same group of N first structures, such that N≥2, the N first structures arranged in the group at a substantially random spacing S having values in a range from about 0.5 microns to about 500 microns and determined from a same predetermined function S(r), r a random number with a probability distribution, such that for a substantially normally incident light and blue, green, and red wavelengths that are at least 50 nm apart from each other and are disposed within respective blue, green and red wavelength ranges extending respectively from about 420 nm to about 480 nm, about 490 nm to about 560 nm, and about 590 nm to about 670 nm, optical transmissions of the optical film versus transmitted angle for the blue, green and red wavelengths comprise respective blue, green, and red transmission bands disposed at angles greater than about 1 degree and having respective blue, green, and red full width at half maxima, at least two of which at least partially overlap.

17. The optical film of claim 16, wherein the probability distribution is a uniform probability distribution.

18. An optical film for reducing at least one of sparkle and moire in a display system, the optical film comprising at least one structured major surface that in at least a first cross-section in a first plane substantially orthogonal to the optical film, comprises a repeating pattern of a same group of N first structures, such that N≥2, the N first structures arranged in the group at spacings in a range from about 0.5 microns to about 500 microns, such that the spacing between each pair of adjacent structures in the group is K*ΔS microns, ΔS a constant greater than about 0.5 and K an integer randomly chosen between 1 and N−1, K being different for each pair of adjacent structures in the group, such that for a substantially normally incident light and blue, green, and red wavelengths that are at least 50 nm apart from each other and are disposed within respective blue, green and red wavelength ranges extending respectively from about 420 nm to about 480 nm, about 490 nm to about 560 nm, and about 590 nm to about 670 nm, optical transmissions of the optical film versus transmitted angle for the blue, green and red wavelengths comprise respective blue, green, and red transmission bands disposed at angles greater than about 1 degree and having respective blue, green, and red full width at half maxima (FWHMs), wherein at least 20% of the green FWHM overlaps each of the blue and red FWHMs.

19. The optical film of claim 18, wherein the blue FWHM overlaps with the red FWHM.

20. The optical film of claim 18, wherein N≤100.

* * * * *